(12) United States Patent
Hluchyj et al.

(10) Patent No.: US 8,543,667 B2
(45) Date of Patent: Sep. 24, 2013

(54) POLICY-BASED CONTENT INSERTION

(75) Inventors: Michael G. Hluchyj, Wellesley, MA (US); Ganesh Pai, Lexington, MA (US); Umamaheswar Reddy, Marlborough, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 45 days.

(21) Appl. No.: 12/013,756

(22) Filed: Jan. 14, 2008

(65) Prior Publication Data

US 2009/0182843 A1 Jul. 16, 2009

(51) Int. Cl.
*G06F 15/16* (2006.01)
(52) U.S. Cl.
USPC ........... 709/219; 709/220; 709/228; 370/232; 370/389
(58) Field of Classification Search
USPC ......... 709/219, 225, 229, 224, 228; 370/232, 370/389; 713/513
See application file for complete search history.

(56) References Cited

U.S. PATENT DOCUMENTS

| | | | |
|---|---|---|---|
| 5,424,770 A | 6/1995 | Schmelzer et al. | |
| 5,534,944 A | 7/1996 | Egawa et al. | |
| 5,805,804 A | 9/1998 | Laursen et al. | |
| 5,859,660 A | 1/1999 | Perkins et al. | |
| 5,878,220 A | 3/1999 | Olkin et al. | |
| 6,154,496 A | 11/2000 | Radha | |
| 6,480,539 B1 | 11/2002 | Ramaswamy | |
| 6,566,541 B2 * | 5/2003 | Liu et al. | 549/551 |
| 6,567,471 B1 | 5/2003 | Yoshinari | |
| 6,636,512 B1 * | 10/2003 | Lorrain et al. | 370/392 |
| 6,693,907 B1 * | 2/2004 | Wesley et al. | 370/390 |
| 6,912,251 B1 | 6/2005 | Ward et al. | |
| 6,944,585 B1 | 9/2005 | Pawson | |
| 7,107,309 B1 | 9/2006 | Geddes et al. | |
| 7,343,485 B1 * | 3/2008 | Huang et al. | 713/153 |
| 7,561,515 B2 * | 7/2009 | Ross | 370/232 |
| 7,752,258 B2 | 7/2010 | Lewin et al. | |
| 7,933,247 B2 * | 4/2011 | Gidwani | 370/332 |
| 8,141,156 B1 * | 3/2012 | Mao et al. | 726/23 |

(Continued)

FOREIGN PATENT DOCUMENTS

EP 0 755 157 A2 1/1997
EP 0 772 360 5/1997

(Continued)

OTHER PUBLICATIONS

International Search Report and Written Opinion for International Application No. PCT/US2009/030495, Date of Mailing May 4, 2009 (8 pages).

(Continued)

*Primary Examiner* — Khanh Dinh
(74) *Attorney, Agent, or Firm* — Joshua T. Matt (57) ABSTRACT

Described are computer-based methods and apparatuses, including computer program products, for policy-based content insertion. A client device transmits to a content server a request for the delivery of content. The content server modifies the request based on an ingress policy. The content server transmits the modified request to a second server where the second server processes the request. The second server transmits a reply to the modified request to the content server. The reply includes a content insertion instruction. The content server transmits the content to the client device based on the content insertion instruction and/or one or more egress policies.

35 Claims, 8 Drawing Sheets

(56) References Cited

U.S. PATENT DOCUMENTS

| | | | |
|---|---|---|---|
| 2002/0027886 A1* | 3/2002 | Fischer et al. | 370/255 |
| 2002/0065073 A1* | 5/2002 | Natani et al. | 455/422 |
| 2002/0080886 A1* | 6/2002 | Ptasinski et al. | 375/295 |
| 2003/0206559 A1* | 11/2003 | Trachewsky et al. | 370/509 |
| 2005/0223107 A1 | 10/2005 | Mine et al. | |
| 2005/0256873 A1 | 11/2005 | Walker et al. | |
| 2006/0023709 A1* | 2/2006 | Hall et al. | 370/389 |
| 2006/0036730 A1* | 2/2006 | Graham et al. | 709/224 |
| 2006/0104230 A1* | 5/2006 | Gidwani | 370/328 |
| 2006/0174035 A1* | 8/2006 | Tufail | 709/239 |
| 2007/0055984 A1 | 3/2007 | Schiller et al. | |
| 2008/0262990 A1* | 10/2008 | Kapoor et al. | 706/20 |
| 2009/0083811 A1 | 3/2009 | Dolce et al. | |
| 2009/0083813 A1 | 3/2009 | Dolce et al. | |
| 2009/0182843 A1* | 7/2009 | Hluchyj et al. | 709/219 |

FOREIGN PATENT DOCUMENTS

| | | |
|---|---|---|
| EP | 1115252 A2 | 7/2001 |
| EP | 1 365 587 | 5/2003 |
| EP | 1655963 A2 | 5/2006 |
| WO | WO 01/56285 | 8/2001 |
| WO | WO 02/09425 A1 | 1/2002 |

OTHER PUBLICATIONS

"Proxy Server," Wikipedia, Jan. 15, 2008, 7 pages.

"Web cache," Wikipedia, Jan. 9, 2008, 2 pages.

"Reverse Proxy," Wikipedia, Jan. 3, 2008, 2 pages.

Cooper, I., et al. "Known HTTP Proxy/Caching Problems," http://tools.ietf.org/html/rfc3143, Jun. 2001, 30 pages.

Cooper, I., et al., "Known HTTP Proxy/Caching Problems," draft-cooper-wrec-known-prob-01.txt, http://tools.ietf.org/html/draft-cooper-wrec-known-prob-01, Apr. 12, 2001, 32 pages.

Cooper, I., et al., "Internet Web Replication and Caching Taxonomy," http://tools,ietf.org/html/rfc3040, Jan. 2001, 30 pages.

Cerpa, A., et al., "NECP the Network Element Control Protocol," http://tools.ietf.org/html/draft-cerpa.necp-02, Feb. 22, 2000, 38 pages.

P. Vixie, et al., "Hyper Text Caching Protocol (HTCP/0.0)," http://tools.ietf.org/html/rfc2756, Jan. 2000, 15 pages.

Field, R., et al. Hypertext Transfer Protocol—HTTP/1.1, http://tools.ietf.org/html/rfc2616, Jun. 1999, 165 pages.

Kristol, David M., "HTTP Proxy State Management Mechanism," http://tools.ietf.org/html/draft-kristol-http-proxy-state-00, May 26, 1998, 9 pages.

Berners-Lee, T., et al., "Hypertext Transfer Protocol—HTTP/1.0," http://tools.ietf.org/html/rfc1945, May 1996, 57 pages.

Hurst et al., "MPEG Splicing: Tutorial and Proposed SMPTE Standard," SMPTE Journal: pp. 1-14 (Nov. 1998).

SCTE 35 (ITU-T J.181): Digital Program Insertin Cueing Message for Cable, pp. 1-37, 2004.

U.S. Appl. No. 12/015,490, Method and Apparatus for Dynamic Transmission Rate Adjustment to Support Seamless Splicing of Compressed Video Streams, pp. 1-38, filed Jan. 16, 2008.

Zhang et al., "Integrated Rate Control and Buffer Management for Scalable Video Streaming," Multimedia and Expo, 2007 IEEE International Conference on, IEEE, PI, Jul. 1, 2007, pp. 248-251, XP031123608.

Zhang et al., "Joint Rate Allocation and Buffer Management for Robust Transmission of VBR Video," 20080301, vol. 34, No. 3, Mar. 1, 2008, pates 337-343, XP02551681.

* cited by examiner

POLICY-BASED CONTENT INSERTION

FIELD OF THE INVENTION

The present invention relates generally to computer-based methods and apparatuses, including computer program products, for policy-based content insertion.

BACKGROUND

Hyper Text Transfer Protocol (HTTP)

The Internet has evolved from a network that provided for simple messaging, file transfer, and remote access to one of a full multimedia experience through the use of web servers and client browsers. Hyper Text Transfer Protocol (HTTP) is the preferred protocol used between a web server and client browser where a client issues HTTP requests (e.g., GET) and the web server responds with HTTP responses (e.g., 200 OK) containing optional data contents. The optional data contents are usually web pages such as Hypertext Markup Language (HTML) documents and linked objects (such as images and videos).

The use of linked objects within a web page makes for a flexible and dynamic conveyance of information. A web page served to a client from one web server may contain linked objects whereby the client browser automatically retrieves content from one or more other web servers to complete the web page. Also, a web server may redirect a client request via a redirect response (such as HTTP 300 Redirect) to another web server. In both cases, this provides a degree of scalability where content can be distributed among multiple web servers and then used in the composition of multiple and potentially different web pages.

The content delivered to a web client has changed from sending only HTML text to sending multimedia content such as sound, images, and/or video. Typically, multimedia content is much larger in size compared to HTML files. Also, the streaming rate and corresponding multimedia content file sizes have increased dramatically from early Internet video displayed in a small 160×120 window at 40 kb/s to 720×480 video streamed at 700 kb/s today going to high definition (HD) 1920×1080 video streamed at 5 Mb/s or greater. As the amount of content that needs to be delivered to support a client request increases, the web server typically needs the ability to read content faster from storage and provide the necessary high-speed protocol processing used to deliver the content to the client. As the number of clients requesting content from a web server increases, the ability to deliver content to each requesting client can be an issue. The situation is compounded by the diversity of requests, as now the web server has to have access to a large library of content to serve these requests. A large library also translates to complex management and layout of content in storage. With the proliferation of streaming video on the internet, not only the size and streaming rate of the content are significantly larger, the content typically must be delivered to the client at a steady rate. Any decrease in the transfer rate from the desired rate can cause interruptions in the client viewing experience, thereby decreasing the overall quality of the experience.

Proxy Servers

Scalability of web servers can be further achieved using proxy servers. Typically, a proxy server is a server that services the requests of clients by forwarding the requests to other servers. A forward proxy server sits in front of a client and forwards all request from the client to the designated servers. A forward proxy server is typically used in an enterprise to provide some degree of security and hiding of clients from external servers. Reverse proxy servers sit in front of a group of web servers and are often used to load balance client requests among the multiple servers in the group each capable of serving the request. A reverse proxy can be policy-based where current load, language, source address, and/or browser cookie, to name a few examples, are used to route a request to a specific server in the group. A reverse proxy server may also include functions such as security, encryption, compression, and caching of content as a means to off-load the processing work of a web server. In the case of caching, the proxy server is able to serve requests for which it has cached the requested content (typically static content), thus off-loading the request from the web server. Here, the client request is not delivered to the web server, but is handled entirely by the proxy server using its content cache. For functions such as security, encryption and compression, the proxy serves as a pre-processing stage for the client requests and a post-processing stage for the web server responses, where all content is still delivered from the web server.

Figure 1:
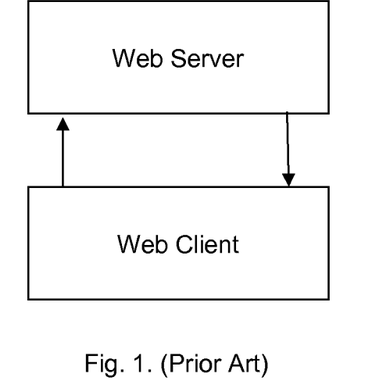
FIG. 1 shows a web server and a web client known in the art.

FIG. 1 illustrates a web server and a web client known in the art. The web client issues an HTTP GET request to a web server, where the Uniform Resource Locator (URL) of the content being requested is a part of the GET request. The URL is used to deliver the GET request to the right application (e.g., database application, map application, etc.) on the web server. The application on the web server applies application logic to determine if the request is to be fulfilled and, if so, the application determines the content file, the bit rate, and any other associated attributes. The application then instructs the web server to stream the file to the client based on the determined attributes. The web server constructs a 200 OK response along with the content inserted at the end of the 200 OK message. The client uses the flow control provided by transmission control protocol (TCP) to pace the rate at which it consumes the content. The client displays the content to the end user at the encoded frame rate.

Figure 2:
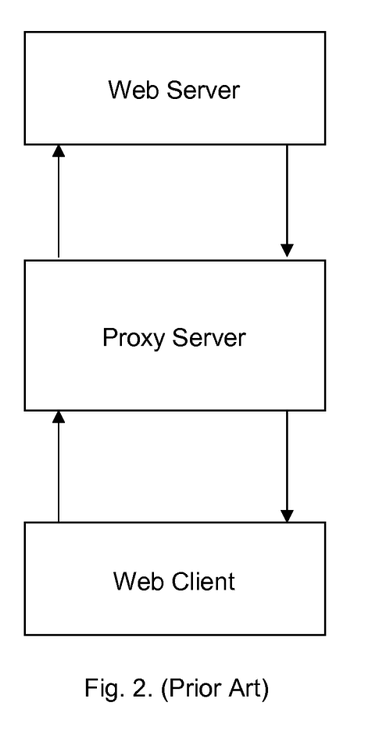
FIG. 2 shows a web server, a proxy server, and a web client known in the art.

FIG. 2 illustrates a web server, a proxy server, and a web client known in the art. The proxy server can operate as a reverse proxy providing a content cache. The HTTP GET request from the client is analyzed by the proxy server to determine if the proxy server has a cached copy of the content and if so, the proxy server provides an immediate response to the web client without forwarding the request to the web server. If the proxy server does not have a cached copy of the content, then the proxy server forwards the HTTP GET request to the web server where the request is analyzed and an HTTP 200 OK response is generated for forwarding via the proxy server to the web client.

In other implementations of the proxy server, the proxy server can provide functions such as security, encryption, or compression. In these implementations, the proxy server provides a pre-processing stage for the client requests and a post-processing stage for the web server responses, where all content is delivered from the web server.

SUMMARY OF THE INVENTION

One aspect to policy-based content insertion is a method. The method includes receiving, at a content server, a content request. The method further includes modifying, at the content server, the content request based on one or more ingress policies. The method further includes transmitting the modified content request to a second server based on one or more routing policies. The method further includes receiving, at the content server, a reply to the modified content request from the second server. The reply includes a content insertion instruction.

Another aspect to policy-based content insertion is a computer program product. The computer program product is tangibly embodied in an information carrier. The computer program product includes instructions operable to cause a data processing apparatus to receive, at a content server, a content request and modify, at the content server, the content request based on one or more ingress policies. The computer program product further includes instructions operable to cause a data processing apparatus to transmit the modified content request to a second server based on one or more routing policies and receive, at the content server, a reply to the modified content request from the second server. The reply includes a content insertion instruction.

Another aspect to policy-based content insertion is a system. The system includes a content server. The content server includes a policy-based proxy module and a content insertion module. The policy-based proxy module is configured to receive a content request, modify the content request based on one or more ingress policies, and transmit the modified content request to a second server based on one or more routing policies. The content insertion module is configured to receive a reply to the modified content request from the second server. The reply includes a content insertion instruction.

Another aspect to policy-based content insertion is a system. The system includes a mean for content insertion. The means for content insertion include a means for receiving a content request and a means for modifying the content request based on one or more ingress policies. The means for content insertion further include a means for transmitting the modified content request to a second server based on one or more routing policies and a means for receiving a reply to the modified content request from the second server. The reply includes a content insertion instruction.

In other examples, any of the aspects above can include one or more of the following features. The content server transmits the content based on one or more egress policies. The one or more egress policies include content rate, content rate adjustment, network congestion, a client type, and/or an encryption requirement. Content located on the content server is associated with the content request based on the content insertion instruction.

In some examples, content located externally from the content server is associated with the content request based on the content insertion instruction. The content associated with the content insertion instruction is transmitted to a computing device associated with the content request. The content is transmitted at a first data rate associated with the content insertion instruction.

In other examples, the first data rate is changed to a second data rate based on network congestion, computing device performance, and/or content server performance. The content request is received employing a network connection. The content is transmitted employing the network connection. The network connection includes a network socket, a network session, a network port, and/or a network address.

In some examples, the transmission of the content employs an internet protocol (IP), a transmission control protocol (TCP), a hypertext transfer protocol (HTTP), a user datagram protocol (UDP), a real-time transport protocol (RTP), a real time messaging protocol (RTMP), a real time streaming protocol (RTSP), an interleaved RTSP, a session initiation protocol (SIP), and/or an IP television protocol.

In other examples, part or all of the content insertion instruction is removed from the reply. The modified reply and the content is transmitted employing a network connection associated with the content request. The modified reply is associated to the modified request based on the content insertion instruction and/or the network connection associated with the content request.

In some examples, the content is appended to the reply. The appended reply is transmitted employing a network connection associated with the content request. The content request includes an HTTP, RTMP, RTSP or SIP request. The modified content request includes a request for the content insertion instruction. The reply includes a corresponding HTTP, RTMP, RTSP or SIP response which includes the content insertion instruction.

In other examples, the content request is modified to insert one or more headers and/or attributes which request the content insertion instruction based on the one or more ingress policies. One or more headers and/or attributes associated with the content insertion instruction are removed from the reply.

In some examples, the one or more routing policies include routing information for content requests and/or application requests. The one or more ingress policies include entitlement information for a network connection associated with the content request, a user associated with the content request, a computing device associated with the content request, a time of day, a geographic location, and/or a service provider identity.

In other examples, the second server is selected from a plurality of second servers based on the one or more routing policies. The second server is an application server, a web server, a management server, a middleware server, a media server, a streaming server, and/or a web streaming server.

In some examples, the content request is modified to request the content insertion instruction associated with content based on the one or more ingress policies. The content insertion instruction includes a first data rate, a content location, an offset for streaming, a congestion management profile, and/or a content playlist.

In other examples, the congestion management profile instructs the content server to modify the rate of content transmission based on network congestion. The content playlist includes one or more advertisements. Each advertisement for the content playlist is dynamically selected by the content server and/or an external application server.

In some examples, the content insertion instruction includes a directive to insert content, a programming language directive, a markup language directive, and/or a scripting language directive. The content server includes a storage system and the content insertion module is further configured to associate content located on the storage system with the content request based on the content insertion instruction.

In other examples, the system includes an external storage system and the content insertion module is further configured to associate content located on the external storage system with the content request based on the content insertion instruction. The content insertion module is further configured to transmit the content associated with the content insertion instruction to a computing device associated with the content request.

In some examples, the content insertion module is further configured to remove part or all of the content insertion instruction from the reply and transmit the modified reply and the content employing a network connection associated with the content request.

In other examples, the content insertion module is further configured to append the content to the reply and transmit the appended reply employing a network connection associated with the content request.

The policy-based content insertion techniques described herein can provide one or more of the following advantages. An advantage is that the streaming of data separated from the processing of a request for the data enables the processing and the streaming to be scaled independently of the other. Another advantage is that the decoupling of the control and application processing from that of media delivery provides for efficient scalable media streaming.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

In general overview, a user requests delivery of content (e.g., multimedia file, text file, binary file, etc.). The user's client (e.g., web browser, file browser, application on set top box, etc.) transmits the request (e.g., HTTP get request, file transfer protocol (FTP) get, a real time streaming protocol (RTSP) setup, etc.) to a content server (also referred to as a policy-based content insertion proxy (PCIP)). The content server modifies the request based on an ingress policy (e.g., user can receive content, network address can receive content, and the like). The content server transmits the modified request to a server (e.g., application server, web server, etc.). The server processes the modified request and transmits a reply to the modified request to the content server. The reply includes a content insertion instruction (e.g., content identification, data rate, etc.). The content server transmits the content to the user's client based on the content insertion instruction and/or one or more egress policies (e.g., burst the initial portion of the content at a high data rate to preload the client playout buffer, modify the content data rate based on network congestion, encrypt the content, and the like) at the content server.

The control plane processing can occur, for example, on general purpose computer servers supporting web services applications and/or other types of applications. The media plane, owning to its much greater bandwidth requirement as a result of serving high quality media streams, and therefore requiring a high bit rate, can stream media, for example, utilizing special purpose media streaming servers.

With the techniques described herein, the control plane and the media plane can utilize, for example, a single socket between a client browser and service which enables the transparent decoupling of the processing and media delivery from the client's perspective. The decoupling can preserve, for example, existing web server control and application compute platforms (e.g., hardware and/or software) and allow, for example, the introduction of new media streaming elements that integrate in a standards compliant way within the protocol framework (e.g., RTSP, HTTP, etc.). The media streaming can be, for example, off-loaded from a web and/or other application server allowing the use of special purpose media streaming components to achieve a high-performance, cost-effective solution for the delivery of high quality video. On the client side, the decoupling, typically, does not impose any changes regarding the request of the video stream. Moreover, on the server side, the decoupling can be integrated, for example, in a standards-compliant fashion with minimal impact to existing video streaming solutions. Such standards can include, for example, RFC 3550, available from the Internet Engineering Task Force (IETF) and RFC 2616, available from the IETF.

Figure 3:
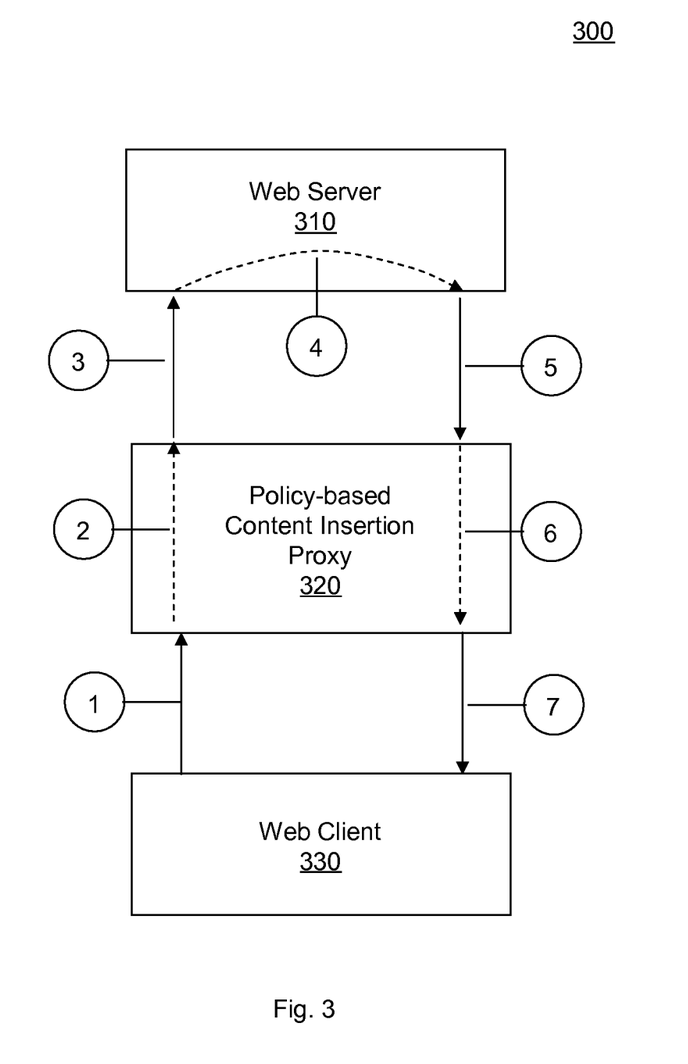
FIG. 3 depicts an exemplary system with a policy-based content insertion proxy.
Figure 4:
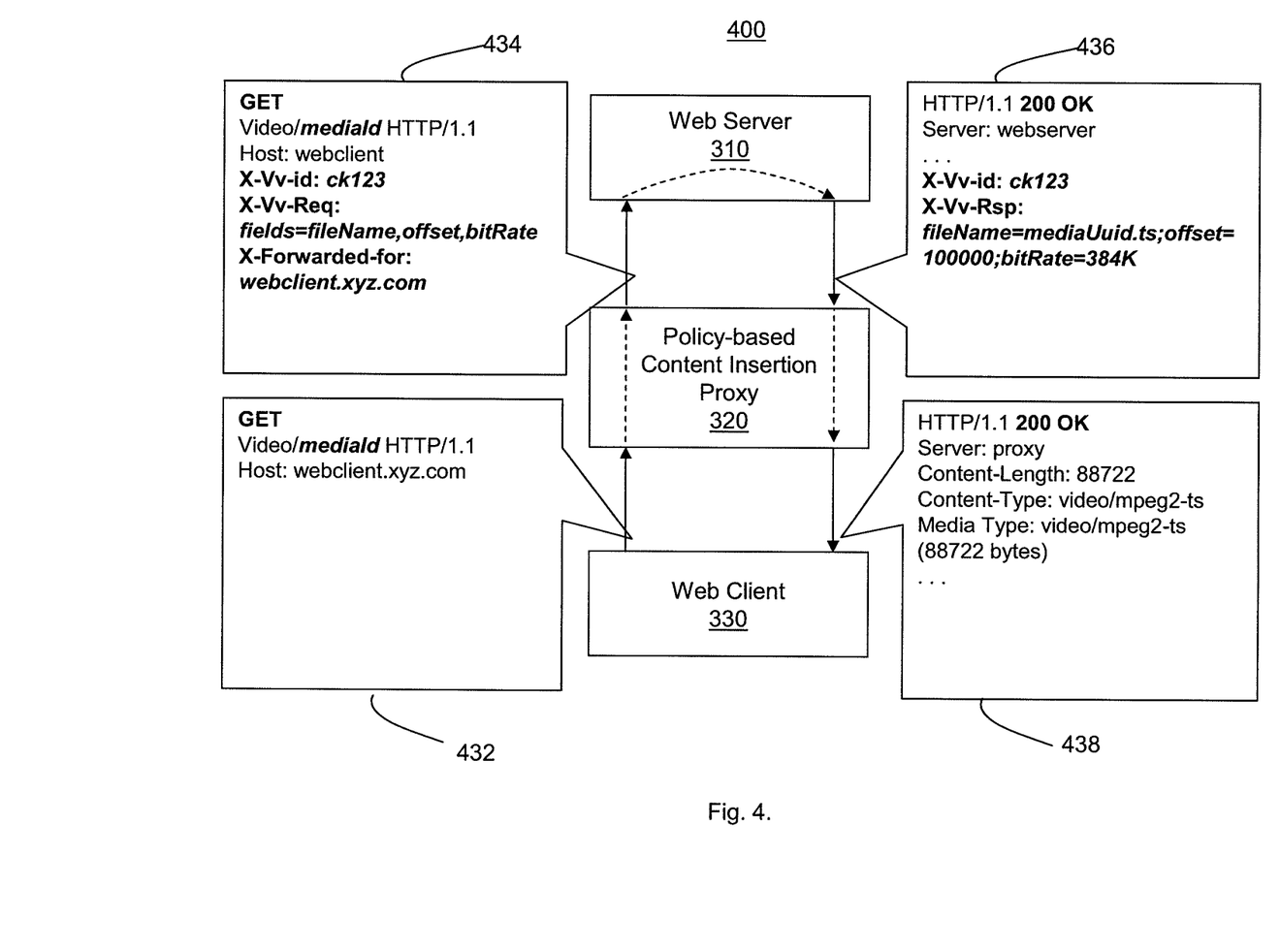
FIG. 4 depicts another exemplary system with a policy-based content insertion proxy.
Figure 5:
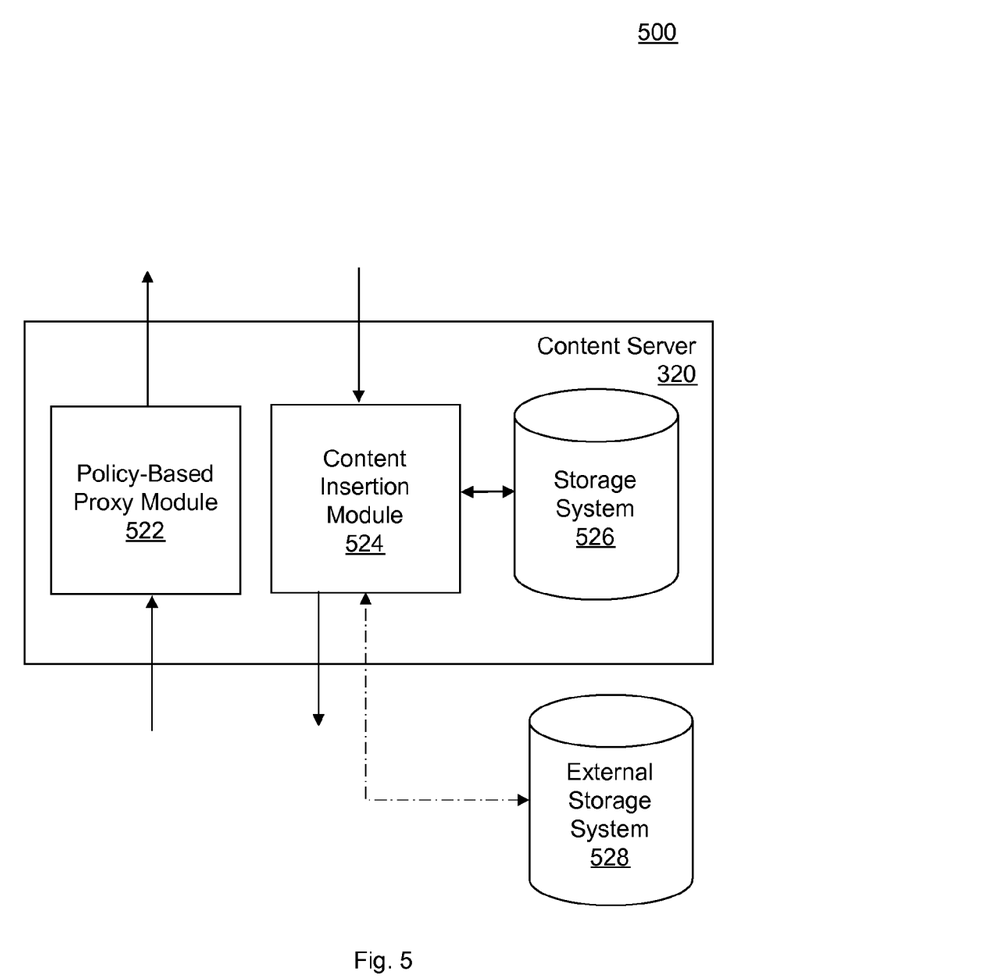
FIG. 5 depicts an exemplary content server.
Figure 6A:
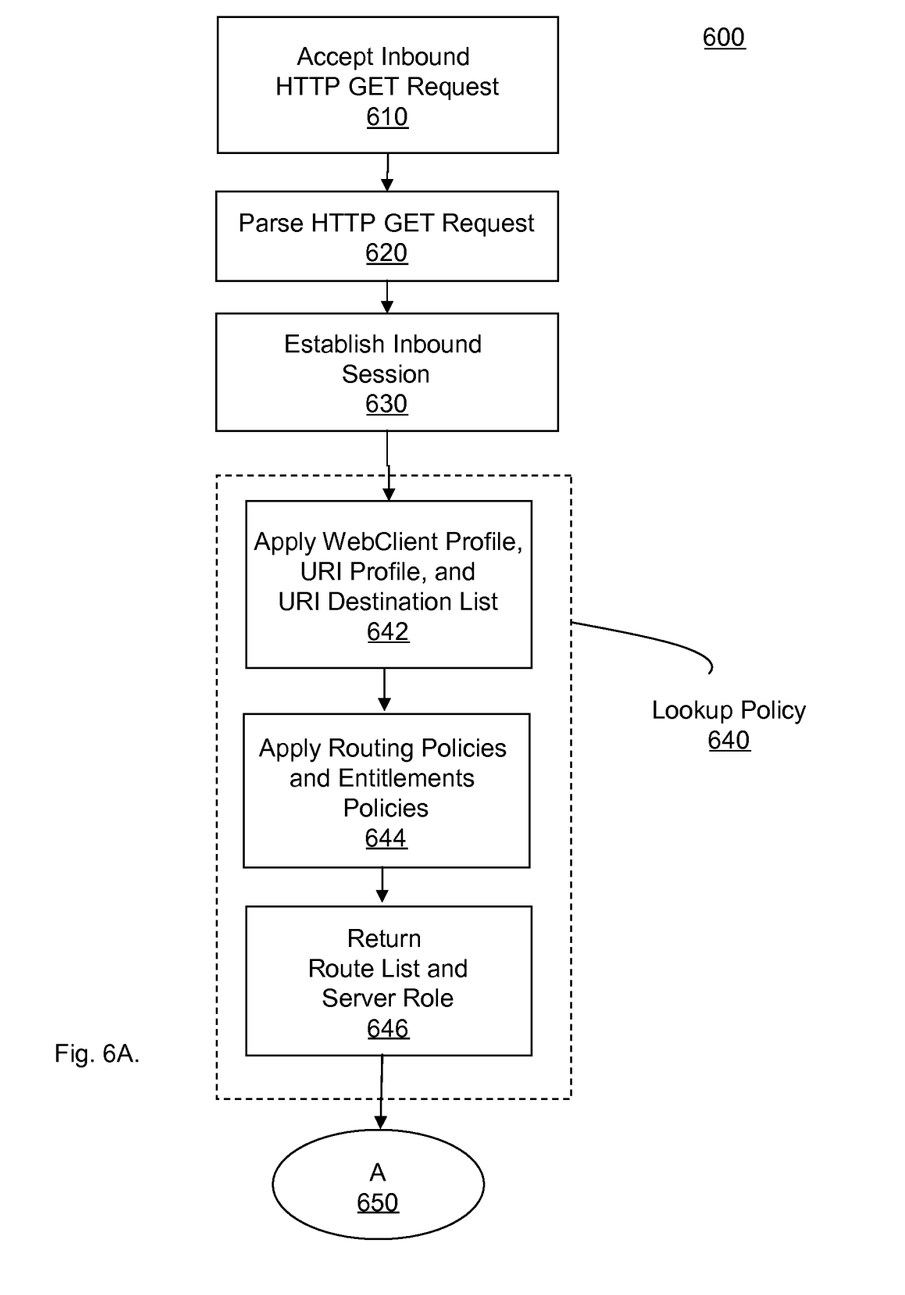
FIGS. 6A-6B depict an exemplary flowchart illustrating applying policies to HTTP requests.
Figure 6B:
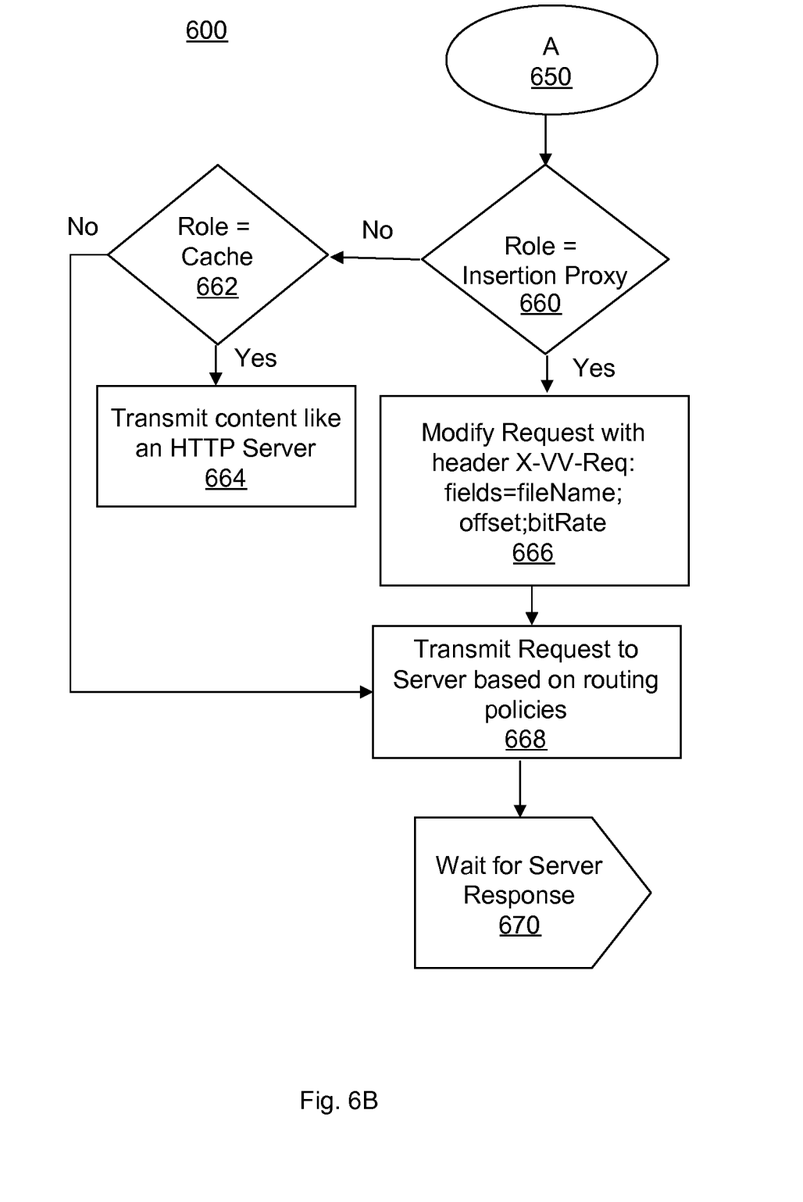
Figure 7A:
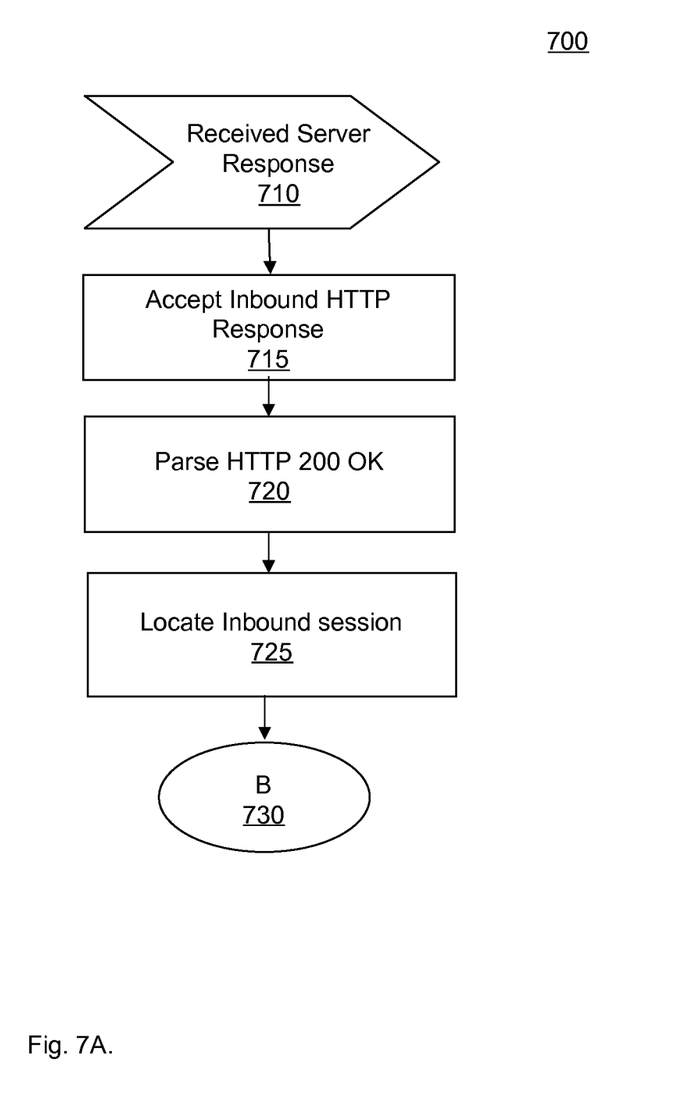
FIGS. 7A-7B depict an exemplary flowchart illustrating inserting content into a HTTP response.
Figure 7B:
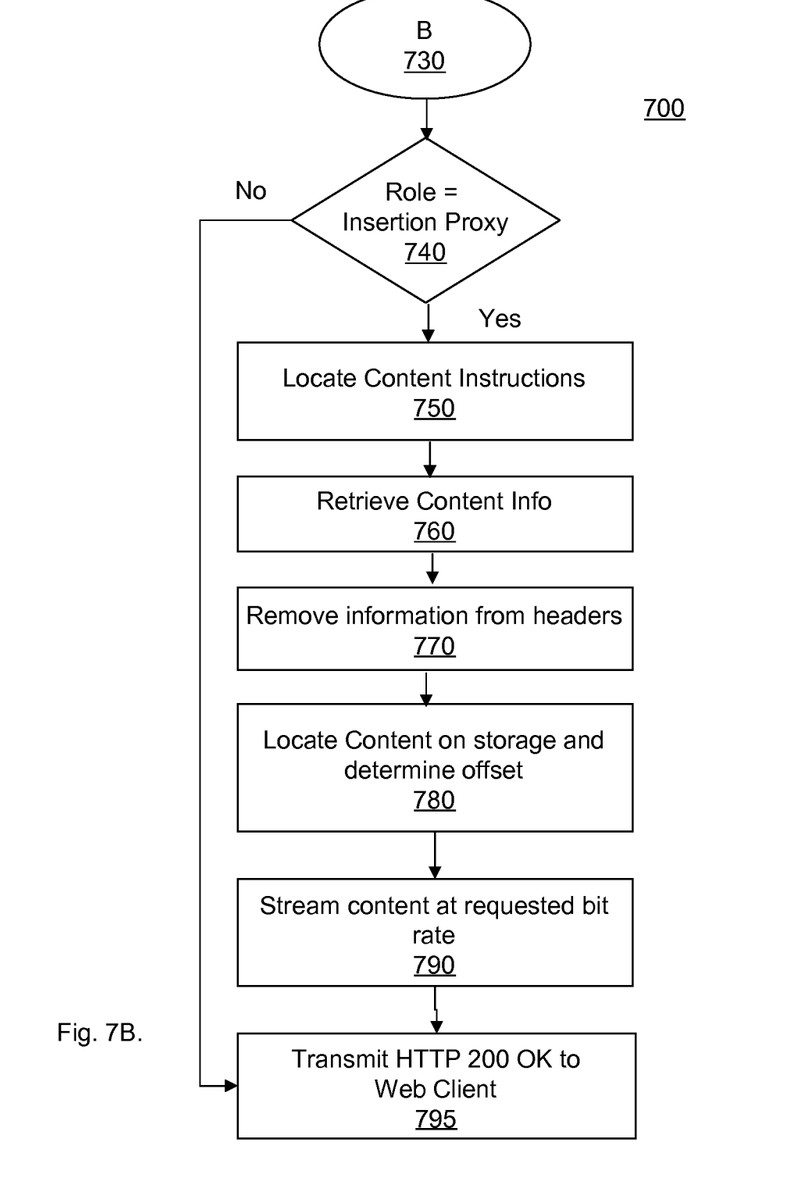

FIGS. 3-5 illustrate exemplary systems and servers that are part of the policy-based content insertion techniques. FIGS. 6-7 illustrate exemplary flowcharts of the processing of HTTP requests and responses, respectively, through the exemplary systems and servers of FIGS. 3-5. The exemplary systems and servers are illustrated through the use of the content server. Other variations and/or exemplary uses of the content server are described below.

Policy-Based Content Insertion

FIG. 3 depicts an exemplary system 300 with a policy-based content insertion proxy (PCIP) 320. The PCIP 320 (also referred to as a content server and/or a type of reverse proxy server) is located between the web client 330 and web server 310. In the system 300, all client requests for content are directed to the PCIP 320. The PCIP 320 is a proxy through which all messaging between the client 330 and server 310 passes. The PCIP 320 inserts content into the HTTP/TCP stream towards the client 330 at the appropriate time. The PCIP 320 can be, for example, a policy-driven, configurable HTTP server. The PCIP 320 advantageously provides the efficient decoupling of control and application plane processing from that of media delivery which increases the efficiency of the delivery of content to clients.

FIG. 3 illustrates policy-based content insertion in an exemplary HTTP request (in this example, GET) and reply (in this example, 200 OK). The exemplary content insertion is illustrated in the following seven steps (indicated by arrows on the system 300).

1. The client 330 sends an HTTP GET request to the PCIP 320. In some examples, the request is no different from the request the client 330 would have sent to the actual web server (in this example, 310). Advantageously, there is no change required on the client 330 since the request is sent through the PCIP 320 and the reply is sent back through the PCIP 320 (in this example, the same network connection is utilized for the communication between the client 330 and the PCIP 320).

2. The PCIP 320, on receipt of a GET request, analyzes the request and consults its configured policies (e.g., ingress policy, routing policy, etc.). The policy logic determines how the request should be handled. In this example, the policy logic in conjunction with provisioned data determines that the request needs to be proxied to an appropriate web server 310.

3. The PCIP 320 appends a header in the GET request. The new header, for example, requests the web server 310 to return back the name of the file that needs to be streamed, the offset from which to begin streaming, and/or the bit rate at which to stream. The PCIP 320 transmits the GET request, with this additional header, to the web server 310, which is responsible for handling the GET request as determined by the configured policies (e.g., the routing policies). The PCIP 320 does not interpret any of the other headers or content in the GET request.

4. The web server 310 processes the request and determines which file needs to be streamed, along with attributes like bit rate and offset into the file from where the streaming should start, based on one or more application policies. The web server 310 constructs the 200 OK message to send back to the client 330. The presence of the header inserted by the PCIP 320 causes the web server 310 to construct the 200 OK response but hold back on retrieving and inserting content into the 200 OK response.

5. Instead, the web server 310 inserts a header into the 200 OK response. The inserted header includes, for example, the name of the file, the offset from which to begin streaming and the bit rate at which to stream the content. The web server 310 transmits the 200 OK with the new header back to the PCIP 320.

6. The PCIP 320, on receipt of the 200 OK, extracts the header inserted by the web server 310. Using the information in the header and/or one or more egress policies configured in the PCIP 320, the PCIP 320 retrieves the content to be inserted into the 200 OK response from a storage system.

7. The PCIP 320 strips out the new header inserted by the web server 310 and forwards the 200 OK. The PCIP 320 appends the content at the end of the 200 OK response just as a prior art web server would have done. The client 330 receiving the response advantageously does not see any difference in the response which reduces the configuration needed for the efficient utilization of the system 300.

An additional advantage is that in the system 300, the PCIP 320 does not host the web application since the web application functionality is implemented by the web server 310, which allows for the PCIP 320 to be configured and optimized to stream content. Another advantage is that the PCIP 320 has a specialized function which is the high-performance delivery of streamed content and which off-loads this compute intensive function from the web server.

In some examples, the PCIP 320 is a content cache proxy, a transparent proxy, and/or a content insertion proxy based on the request/response being processed. In other examples, the client 330 processes the response and displays video. Any subsequent pause, rewind, and/or fast forward requests from the client 330 can be, for example, processed as described herein.

Although FIG. 3 illustrates the web client 330 and the web server 310, other types of clients and servers can communicate and be utilized with the PCIP 320. The other types of clients can include, for example, a file transfer protocol (FTP) client, a media client, a management console client, an application client, and/or any other type of computer client. The other types of servers can include, for example, an application server, a management server, a middleware server, a media server, a streaming server, a web streaming server, and/or any other type of computer server.

For example, a set top box (STB) with a media client 330 requests a video on demand through an IPTV network. The request (in this example, a TCP/IP request) is directed to the content server 320 (also referred to as a PCIP). The content server 320 processes the request as described above and transmits the modified request (in this example, a modified TCP/IP request) to the application server 310 (in this example, the application server at the cable headend). The application server 310 processes the modified request as described above and replies. The reply includes two content insertion instructions (in this example, content identification, content data rate). The content server 320 replies to the request with a stream of the requested content based on the content insertion instruction and transmits the reply. The offloading of the streaming of the content advantageously allows the application server 310 to process more requests while allowing the streaming to be done by a content server 320 that is designed to stream content.

Although FIG. 3 illustrates a single box for the web server 310, the system 300 can include, for example, a plurality of servers (e.g., web server 310 can represent a server farm or other group of servers logically and/or physically grouped together) which process the requests and/or reply to the request. The PCIP 320 can determine, for example, a server from the plurality of servers based on one or more routing policies. For example, the PCIP 320 receives an HTTP request for http://www.sometestdomain.net and has a routing policy that all HTTP requests for .sometestdomain.net domain are directed to a second web server. The PCIP 320 transmits the modified request (in this example, directed to http://www.sometestdomain.net) to the second web server. As another example, the PCIP 320 receives a FTP request for ftp://sometestdomain.net and has a routing policy that all FTP requests for .sometestdomain.net domain are directed to a third FTP server. The PCIP 320 transmits the modified request (in this example, directed to ftp://sometestdomain-.net) to the third FTP server.

Although FIG. 3 illustrates a single web client 330, a plurality of clients (e.g., one thousand, ten thousand, one hundred thousand) can communicate with the PCIP 320. The PCIP 320 can process, for example, requests from, replies to, and/or streams to a plurality of clients nearly simultaneously. For example, the PCIP 320 nearly simultaneously streams a movie to an application client on a STB utilizing IPTV, modifies a HTTP request from a web client, and receives a reply from a FTP server.

Although FIG. 3 illustrates the web client 330, the PCIP 320, and the web server 310 connected to each other, the web client 330, the PCIP 320, and the web server 310 can be, for example, connected through one or more communication networks (e.g., internet, intranet, etc.), with other computing devices (e.g., routers) between them. The web client 330 and the PCIP 320 can be, for example, connected through a first communication network and the PCIP 320 and the 310 can be connected through a second communication network. In other examples, the web client 330, the PCIP 320, and the web server 310 are connected to the same communication network.

In some examples, the PCIP 320 receives requests and transmits replies utilizing the same network connection. The network connection can be, for example, a network socket, a network session, a network port, a network address, and/or any other type of network identification mechanism.

Typically, web servers (e.g., 310) and clients (e.g., 330) can communicate using HTTP sessions over TCP. For each unique connection/session between a client 310 and server 330, TCP abstracts the endpoint into what is typically referred to as a socket. Data written at one end of the socket from the client/server side emerges from the socket of the server/client in a reliable sequenced fashion. TCP processing uses checksum, re-transmission and/or other mechanisms to provide reliable transport. These TCP features require significant processing resources proportional to the streaming rate of the delivered content and add another scaling dimension to media delivery requirements beyond content retrieval from storage. Another advantage of the tight coupling of the control plane (e.g., web server 310) and data plane (e.g., PCIP 330) on a single communication endpoint (e.g., network socket) is that the processing resources required for the network communication can be offloaded to the data plane thereby enabling the control plane to more efficiently process requests.

FIG. 4 depicts another exemplary system 400 with the policy-based content insertion proxy 320. FIG. 4 illustrates sample HTTP messages 432, 434, 436, and 438 (in this example, GET and 200 OK messages) between the web client 330 and the PCIP 320 and between the PCIP 320 and the web server 310. These messages 432, 434, 436, and 438 illustrate a header insertion by the PCIP 320 in the inbound HTTP GET message before delivery to the web server 310, and a header deletion by the PCIP 320 in the inbound HTTP 200 OK message with content insertion before delivery to the web client 330.

The web client 330 transmits a HTTP GET message 432 which requests mediaID. The PCIP 320 modifies the HTTP GET message 434 based on one or more ingress policies. For example, an ingress policy can represent (e.g., in some computer-readable form) that the web client 330 can access the media and the domain xyz.com can access the media. The modified HTTP GET message 434 includes an identification (in this example, ck123), a request (in this example, file name, offset, and bit rate), and the forwarded address (in this example, webclient.xyz.com).

The web server 310 utilizes one or more application policies to determine the reply to the modified request 434. The web server 310 transmits a reply 436 to the modified request 434. The reply 436 includes content insertion instructions for the requested content (in this example, the identification, the file name, the offset, and the bit rate associated with the requested content). The PCIP 320 removes part or all of the content insertion instructions from the reply 436. The PCIP 320 uses the content insertion instruction to obtain the requested content and transmit the modified reply 438, which includes the requested content (in this example, video/mpeg2-ts), to the web client 330.

In some examples, the one or more ingress policies include entitlement information for a network connection associated with the content request (e.g., originating network, domain name, IP address, etc.), a user associated with the content request (e.g., anonymous user, registered user, guest user, etc.), a computing device associated with the content request (e.g., a personal digital assistant device, a personal computer device, a STB device, etc.), a time of day (e.g., set hours, night, day, etc.), a geographic location (e.g., New York, Southern United States, United States, North America, Asia, etc.), a service provider identity (e.g., certain cable provider, certain mobile telephone provider, etc.), and/or any other type of access control mechanisms associated with content.

FIG. 5 depicts the exemplary content server 320 in a system 500. The content server 320 includes a policy-based proxy module 522, a content insertion module 524, and a storage system 526. The system 500 can include, for example, an external storage system. The policy-based proxy module 522 receives requests from one or more clients (not shown) and modifies the requests based on one or more ingress policies. The policy-based proxy module 522 transmits the modified request to a server selected from one or more servers based on one or more routing policies.

The content insertion module 524 receives replies to the modified content requests from the one or more servers. The replies include content insertion instructions which enable the content insertion module 524 to obtain content and transmit that content to the client that requested the content. The content insertion module 524 associates the content insertion instructions (e.g., instructions include content file path, instructions include content unique identifier) with content to be obtained and provided to the requested client. The content can be, for example, located in the storage system 526 on the content server 320 and/or in the external storage system 528 (e.g., storage area network (SAN), network-attached storage (NAS), network file system (NFS) server, FTP server, HTTP server, etc.). The content insertion module 524 transmits the reply with the embedded content and/or the content to the client (i.e., the user's computing device) associated with the request. The content can be, for example, embedded into the reply (e.g., reply 438) and/or transmitted separately from the reply depending on the transmission protocol, the client type, and/or any other information associated with the content request.

Content Request

FIGS. 6A-B depict an exemplary flowchart 600 illustrating applying policies to HTTP requests through the exemplary system 300 of FIG. 3. The flowchart 600 illustrates the PCIP 320 decision logic for an inbound HTTP GET request (e.g., 432) from the web client 330 to the PCIP 320 with the PCIP 320 providing the functions of a cache, transparent, or content insertion proxy depending on the request/response being processed.

The PCIP 320 accepts (610) an inbound HTTP GET request (e.g., 432) from the web client 330. The PCIP 320 parses (620) the HTTP GET request (e.g., 432) to determine the contents of the request. The PCIP 320 establishes (630) an inbound session with the web client 330. The PCIP 320 performs processing (640) to apply a lookup policy. This processing includes steps 642, 644, and 646. The PCIP 320 applies (642) a web client profile, a uniform resource identifier (URI) profile, and a URI destination list to determine if the web client 330, the client's network, and the destination can be accessed by the request. In this example, the web client profile, the URI profile, and the URI destination list are part of the ingress policies. A web client profile can be, for example, a computer-readable representation that a certain client can not receive content, all clients can receive content, etc. A uniform resource identifier (URI) profile can be, for example, a computer-readable representation that certain URIs can only be transmitted upon authentication, certain URIs can be transmitted to anyone, etc. A URI destination list can be, for example, a computer-readable representation that certain URIs can only receive G rated content, certain URIs must be authenticated, etc.

The PCIP 320 applies (644) routing policies and entitlement policies (e.g., user receives a high data rate, user receives low data rate, etc.) to determine which server to transmit the modified request to and how to modify the request. The PCIP 320 returns (646) a route list and server role (e.g., insertion proxy, cache, pass-through) based on the routing policies and the entitlement policies. The flowchart 600 continues (650) from FIG. 6A to FIG. 6B.

The PCIP 320 determines (660) if the role is insertion proxy. If the role is insertion proxy, then the PCIP 320 modifies (666) the request with header fields and/or other attributes (in this example, file name, offset, and bit rate) based on the ingress policies (in this example, the web client profile, the URI profile, and the URI destination list). The PCIP 320 transmits (668) the modified request (e.g., 434) to the server (e.g., web server 310) selected from the plurality of servers based on the routing policies. The PCIP 320 then waits (670) for a response from the web server 310.

If the role is not insertion proxy, then the PCIP 320 determines (662) if the role is cache. If the role is cache, then the PCIP 320 transmits (664) the requested content the same as an HTTP server (e.g., web server 310) would transmit the content. In other words, the PCIP 320 transmits the content without communicating with the web server 310.

If the role is not cache, then the PCIP 320 transmits (668) the request to the server based on the routing policies. The PCIP 320 then waits (670) for a response from the web server 310. The routing policies can include, for example, routing information for content requests (e.g., requests for movie content are directed to a fourth server, requests for mpeg content are directed to a fifth server, etc.), application requests (e.g., requests for billing are directed to a billing server, requests for authentication are directed to a authentication server, etc.), and/or any other type of routing information.

Although FIG. 3 illustrates a request from a web client 330 and FIG. 6 illustrates a HTTP request, the request can be from any type of computing device and/or can be in any protocol. In some examples, the request is received from the PCIP 320 (e.g., for storage of the content in a different location on the storage system), another computer server, a second PCIP, a second external storage system, and/or any other computing device. The request can include, for example, HTTP, real time messaging protocol (RTMP), real time streaming protocol (RTSP), session initiation protocol (SIP), and/or any other type of protocol that can be used to make such a request. As such, the reply includes a corresponding HTTP, RTMP, RTSP, SIP, and/or other protocol response which includes one or more content insertion instructions.

Content Insertion Instruction

In response to a request, the web server 310 can, for example, generate the one or more content insertion instructions based on one or more application policies (e.g., user has access to content, domain has access to content, domain has to pay for content, user has to pay for content, etc.). The one or more content insertion instructions can include a variety of different types of information that instruct a server on where and/or how to obtain and/or transmit requested content to the client making the request. The content insertion instructions can include, for example, a data rate (e.g., data rate=400 kb/s, data rate=10 Mb/s), a content location (e.g., file=MovieA3234, location=\dev\disk2\movies\AL4.m4a), an offset for streaming (e.g.: 4 minutes, 3 seconds, 2 frames; 20 minutes, 0 seconds, 4 frames; 24 frames, etc.), a congestion management profile (e.g.; stream at maximum rate until network capacity is above 60%; stream at minimum rate unless network capacity is below 30%; stream at maximum rate if TCP network throughput allows, stream at minimum rate otherwise), a content playlist (e.g., list of movies, list of television shows), and/or any other type of content instruction.

For example, the web server 310 generates the content insertion instructions of content location=\NYServer\Module0A\movie2342.mpg, the bitrate=3 Mb/s, and the offset=(9 minutes, 32 seconds, 5 frames). As another example, the web server 310 generates the content insertion instructions of content identifier=MovieA3234, the bitrate=400 kb/s, and encryption=public-key alpha.

In other examples, the web server 310 authenticates the user's login utilizing a backend authentication system (not shown). The user is classified as a high data rate client type (e.g., the user pays for the high data rate, the user is on a network that can receive a high data rate, etc.). As such, the web server 310 generates a content insertion instruction that the data rate is high (in this example, 10 Mb/s). In this example, the content insertion instruction is bitrate=10 Mb/s. In another example, the web server 310 determines that all replies and content to the testxyz.com domain are encrypted. As such, the web server 310 generates a content insertion instruction that the content is encrypted (e.g., data encryption standard (DES), public-key encryption, etc.). In this example, the content insertion instruction is encryption=DES.

In some examples, the web server 310 determines which content to stream and at what rate to a specific client based on the one or more application policies. The web server 310 can interface, for example, to databases and/or back office systems to determine how to handle each client request (e.g., authentication, billing, etc.) based on the one or more application polices. For example, the web server 310 communicates with a billing server (not shown) to bill the user's account for the requested movies. An another example, an application policy is that all requests for movies are authenticated through an authentication server (not shown) and then billed to a billing server (not shown). For example, another application policy is that requests for new television shows (e.g., within past 2 weeks, within past 5 days) are billed to a billing server only. An advantage to the streaming of content on the PCIP 320 is that standard compute servers (e.g., web server 310) are well suited to implement the application logic but do not perform well for delivering a large number of high bit rate content streams.

In other examples, the web server 310 includes application intelligence. For example, a web client 330 initiates a request to watch a video by sending a control plane payload in the HTTP request (GET) 432. This control plane payload is destined for a component on the web server 310 which has the application intelligence (e.g., Active Server Pages (.NET) and JavaServer Pages (JSP)) to interpret and understand the nature of the request. After applying the intelligence, the web server 310 transmits a reply 436 to the PCIP 320. The reply 436 enables the PCIP 320 to stream the content by first constructing a 200 OK HTTP envelope and then embedding the video stream behind the 200 OK header. The 200 OK message 438 (header and video stream) is written into the socket by the PCIP 320.

In some examples, the content insertion instruction includes a content playlist which includes one or more advertisements (e.g., dog food commercial, soap commercial). The PCIP 320 and/or an external application server (not shown) can dynamically select each advertisement for the content playlist. For example, the user requests Super Dog the movie and the external application server associates Super Dog the movie with a dog food commercial and a dog shampoo commercial. As such, the content playlist includes Super Dog the movie, the dog food commercial, and the dog shampoo commercial.

In other examples, the content insertion instruction includes a directive to insert content (e.g., insert=MovieA32, append=MovieB323), a programming language directive (e.g., #include=encryption, #region=USA), a markup language directive (e.g., X-Vv-id: ck123, X-Vv-Rsp: fileName=mediaUuid.ts), a scripting language directive (e.g., use language=English, use caption=Spanish), and/or any other type of directive.

Response

As described above, the PCIP 320 obtains and transmits content based on the one or more content insertion instructions that are inserted into a response by the web server 310. FIG. 7 depicts an exemplary flowchart 700 illustrating inserting content into a HTTP response based on the one or more content insertion instructions using the exemplary system 300 of FIG. 3. The flowchart 700 illustrates the PCIP decision logic for an inbound HTTP 200 OK response from the web server 310 to the PCIP 320, with the PCIP 320 providing the functions of a transparent or content insertion proxy.

The PCIP 320 receives (710) a response (also referred to as a reply) from the web server 310. The PCIP 320 accepts (715) the inbound HTTP response (e.g., 436). The PCIP 320 parses (720) the HTTP response to determine the content insertion instructions (e.g., identifier, content location, data rate, directives, etc.). The PCIP 320 locates (725) the inbound session based on the applicable content insertion instruction(s) (e.g., identifier, etc.), the network connection associated with the content request, and/or information associated with the HTTP response (e.g., client information, domain information, etc.). The flowchart 700 continues (730) from FIG. 7A to FIG. 7B.

The PCIP 320 determines (740) if the role is insertion proxy. If the role is not insertion proxy, then the PCIP 320 transmits (795) the HTTP response to the web client 330. If the role is insertion proxy, then the PCIP 320 locates (750) the applicable content instructions associated with obtaining and transmitting the requested content (e.g., content name, data rate). The PCIP 320 then retrieves (760) information about the content (e.g., the location on the storage system of the content, the location on an external storage system of the content, etc.), using, for example, a stored lookup table. The PCIP 320 removes (770) certain data from the headers (e.g., data rate=400 kb/s, offset=(1 hr, 10 min, 5 sec, 11 frames) and/or attributes (e.g., from=web server, port=80) that is not needed by the client (e.g., one or more of the content insertion instructions from the response). In some examples, PCIP removes (770) all headers that were inserted by server 310. The PCIP 320 locates (780) the content on the storage system and determines the offset of the content. The PCIP 320 streams (790) the content to the web client 330 at the requested bit rate. The PCIP 320 transmits (795) the modified HTTP response to the web client 330.

In some examples, the PCIP 320 transmits (795) the modified HTTP response to the web client 330 at a specified data rate based on the content insertion instruction (e.g., bitrate=500 kb/s, bitrate=10 Mb/s) and/or one or more egress policies. The PCIP 320 can change the specified data rate to a different data rate based on network congestion (e.g., transmission network above 90% capacity, data packets latency over 100 ms between PCIP 320 and web client 330, etc.), computing device performance (e.g., STB incoming processing above 95% capacity, cell phone storage above 75% capacity, etc.), content server performance (e.g., storage system above 90% storage capacity, content insertion module processing above 75% capacity, etc.), congestion management profile (e.g., reduce all data rates above 1 Mb/s when the network is above 75% capacity, reduce non-real time transmission data rates when the network is above 80% capacity) and/or any type of congestion and/or performance metric. The one or more egress policies include a content rate (e.g., transmissions to testdomain.net are at 1 Mb/s, transmission to testdomain.net should not exceed 2 Mb/s, etc.), a content rate adjustment (e.g., up all rates for certain domains by 500 kb/s, reduce all rates for certain domains by 100 kb/s, etc.), network congestion (e.g., transmission network above 90% capacity, data packets latency over 100 ms between PCIP 320 and web client 330, etc.), a client type (e.g., personal computer, cell phone, web browser, etc.), an encryption requirement (e.g., all transmissions to testdomain.net use DES, transmissions over 10 Mb/s do not use encryption, etc.), and/or any other type of egress rule.

Other Exemplary Uses

Although FIGS. 6A-6B and 7A-7B provide examples of a HTTP request and response, the PCIP 320 can be utilized for other applications that benefit from the off-loading of delivering high bit rate streams (e.g., IPTV, propriety streaming technology, etc.). The PCIP 320 can be utilized, for example, for Web streaming, IPTV, cable VOD applications, streaming large data files (software distribution), and/or other large data file streaming applications. For example, the request can be a SIP request and the reply can be a SIP reply. As another example, the request can be an IPTV request and the reply can be an IPTV reply. Another advantage is that technology which does not and/or cannot separate the processing of control plane and media delivery in a computing environment can utilize the PCIP 320 to implement a scalable streaming solution.

In some examples, Internet Protocol Television (IPTV) based Video-on-Demand (VOD) servers use the Real Time Streaming Protocol (RTSP) to stream content to clients. In this example the PCIP 320 acts as an Application Layer Gateway (ALG) which inserts headers and interprets headers embedded in the RTSP signaling. As described above in the web context, the PCIP 320 streams the content and the VOD processes requests.

In other examples, RTSP signaling is sometimes used in an interleaved mode to work around issues with firewalls. Interleaved-RTSP uses the same socket for delivering the control and media packets. As such, the PCIP 320 can be utilized to process the RTSP control packets and interleave the media content into the control response to the client (e.g., web client 330).

In some examples, the PCIP 320 streams content utilizing proprietary streaming technologies. The proprietary streaming technologies can include, Adobe Flash (available from Adobe System Incorporated of San Jose, Calif.), RealMedia (available from RealNetwork, Inc. of Seattle, Wash.), QuickTime (available from Apple, Inc. of Cupertino, Calif.), Windows Media (available from Microsoft Corporation, of Redmond, Wash.), and/or any other type of streaming technology.

The transmission of the content from the PCIP 320 to the client (e.g., web client 330) can employ, for example, an internet protocol (IP), a transmission control protocol (TCP), a hypertext transfer protocol (HTTP), a user datagram protocol (UDP), a real-time transport protocol (RTP), a real time messaging protocol (RTMP), a real time streaming protocol (RTSP), an interleaved RTSP, a session initiation protocol (SIP), an IP television protocol, and/or any other type of communication protocol.

In some examples, the PCIP 320 is distributed among a plurality of servers in a server farm. The server farm can be, for example, at one geographical location (e.g., a data center) or distributed among a plurality of geographical locations (e.g., multiple data centers).

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

Examples of communication networks include a packet-based network and/or a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The client can be, for example, part of and/or implemented on a computing device. The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for content insertion, the method comprising:
   receiving, at a content server, a content request from a requesting computing device;
   modifying, at the content server, the content request by adding data to the content request, the data comprising one or more headers, attributes, or both, based on the content request;
   transmitting, by the content server, the modified content request to a second server based on one or more routing policies; and
   receiving, at the content server, a reply message responsive to the modified content request from the second server, the reply comprising a content insertion instruction comprising data indicative of content to transmit to the requesting computing device.

2. The method of claim 1, further comprising transmitting, by the content server, the requested content to a client that transmitted the content request.

3. The method of claim 2, wherein transmitting is based on one or more egress policies comprising content rate, content rate adjustment, network congestion, a client type, an encryption requirement, or any combination thereof.

4. The method of claim 1, further comprising associating content located on the content server with the content request based on the content insertion instruction.

5. The method of claim 1, further comprising associating content located externally from the content server with the content request based on the content insertion instruction.

6. The method of claim 1, further comprising transmitting the content associated with the content insertion instruction to a computing device associated with the content request.

7. The method of claim 6, wherein transmitting the content comprises transmitting the content at a first data rate associated with the content insertion instruction.

8. The method of claim 7, further comprising changing the first data rate to a second data rate based on network congestion, computing device performance, content server performance, or any combination thereof.

9. The method of claim 6,
wherein receiving the content request comprises receiving the content request employing a network connection, and
wherein transmitting the content comprises transmitting the content employing the network connection.

10. The method of claim 9, wherein the network connection comprises a network socket, a network session, a network port, a network address, or any combination thereof.

11. The method of claim 6, wherein transmitting the content comprises transmitting the content employing an internet protocol (IP), a transmission control protocol (TCP), a hypertext transfer protocol (HTTP), a user datagram protocol (UDP), a real-time transport protocol (RTP), a real time messaging protocol (RTMP), a real time streaming protocol (RTSP), an interleaved RTSP, a session initiation protocol (SIP), an IP television protocol, or any combination thereof.

12. The method of claim 1, further comprising:
removing part or all of the content insertion instruction from the reply; and
transmitting the modified reply and the content employing a network connection associated with the content request.

13. The method of claim 12, further comprising associating the modified reply to the modified request based on the content insertion instruction, the network connection associated with the content request, or both.

14. The method of claim 1, further comprising:
appending the content to the reply to provide an appended reply; and
transmitting the appended reply employing a network connection associated with the content request.

15. The method of claim 1, wherein the content request comprises an HTTP, RTMP, RTSP or SIP request, the modified content request comprises a request for the content insertion instruction, and the reply comprises a corresponding HTTP, RTMP, RTSP or SIP response which comprises the content insertion instruction.

16. The method of claim 1, wherein the header data requests the content insertion instruction based on one or more ingress policies.

17. The method of claim 1, further comprising removing one or more headers, attributes, or both associated with the content insertion instruction from the reply.

18. The method of claim 1, wherein the one or more routing policies comprise routing information for content requests, application requests, or both.

19. The method of claim 16, wherein the one or more ingress policies comprise entitlement information for a network connection associated with the content request, a user associated with the content request, a computing device associated with the content request, a time of day, a geographic location, a service provider identity, or any combination thereof.

20. The method of claim 1, further comprising selecting the second server from a plurality of second servers based on the one or more routing policies.

21. The method of claim 1, wherein the second server is an application server, a web server, a management server, a middleware server, a media server, a streaming server, a web streaming server, or any combination thereof.

22. The method of claim 1, wherein modifying the content request comprises modifying the content request to request the content insertion instruction associated with content based on one or more ingress policies.

23. The method of claim 1, wherein the content insertion instruction comprises a first data rate, a content location, an offset for streaming, a congestion management profile, a content playlist, or any combination thereof.

24. The method of claim 23, wherein the congestion management profile instructs the content server to modify the rate of content transmission based on network congestion.

25. The method of claim 23, wherein the content playlist comprises one or more advertisements.

26. The method of claim 25, further comprising dynamically selecting each advertisement for the content playlist by the content server, an external application server, or both.

27. The method of claim 1, wherein the content insertion instruction comprises a directive to insert content, a programming language directive, a markup language directive, a scripting language directive, or any combination thereof.

28. A computer program product, tangibly embodied in a non-transitory computer readable storage medium, the computer program product including instructions being operable to cause a data processing apparatus to:
receive, at a content server, a content request from a requesting computing device;
modify, at the content server, the content request by adding data to the content request, the data comprising one or more headers, attributes, or both, based on the content request;
transmit, by the content server, the modified content request to a second server based on one or more routing policies; and
receive, at the content server, a reply message responsive to the modified content request from the second server, the reply comprising a content insertion instruction comprising data indicative of content to transmit to the requesting computing device.

29. A system for content insertion, the system comprising:
a content server comprising:
a proxy module configured to:
receive a content request from a requesting computing device;
modify the content request by adding data to the content request, the data comprising one or more headers, attributes, or both, based on the content request;
transmit the modified content request to a second server based on one or more routing policies; and
a content insertion module configured to receive a reply message responsive to the modified content request from the second server, the reply comprising a content insertion instruction comprising data indicative of content to transmit to the requesting computing device.

30. The system of claim 29, wherein the content server further comprising a storage system and wherein the content insertion module is further configured to associate content located on the storage system with the content request based on the content insertion instruction.

31. The system of claim 29, further comprising an external storage system and wherein the content insertion module is further configured to associate content located on the external storage system with the content request based on the content insertion instruction.

32. The system of claim 29, wherein the content insertion module is further configured to transmit the content associated with the content insertion instruction to a computing device associated with the content request.

33. The system of claim 29, wherein the content insertion module is further configured to:
   remove part or all of the content insertion instruction from the reply; and
   transmit the modified reply and the content employing a network connection associated with the content request.

34. The system of claim 29, wherein the content insertion module is further configured to:
   append the content to the reply to provide an appended reply; and
   transmit the appended reply employing a network connection associated with the content request.

35. A system for content insertion, the system comprising:
   a means for content insertion comprising:
      a means for receiving a content request from a requesting computing device;
      a means for modifying the content request by adding data to the content request, the data comprising one or more headers, attributes, or both, based on the content request;
      a means for transmitting the modified content request to a second server based on one or more routing policies; and
      a means for receiving a reply message responsive to the modified content request from the second server, the reply comprising a content insertion instruction comprising data indicative of content to transmit to the requesting computing device.

* * * * *